Patented Nov. 7, 1933

1,934,637

UNITED STATES PATENT OFFICE 1,934,637

REDUCTION OF SOLIDS

Harold Robert Rafton, Andover, Mass., assignor to Raffold Process Corporation, a corporation of Massachusetts No Drawing. Application July 18, 1930
Serial No. 468,984

7 Claims. (Cl. 83—94)

My invention relates to the reduction of oversize particles of finely divided solid materials.

The principal object of my invention is to provide a method for the reduction of the oversize particles of finely divided solid materials.

An important object is to provide a method for the reduction of particle size of materials having a relatively coarse particle size.

A further object is to provide such a process which is susceptible of inclusion into already existing manufacturing operations.

A further object is to provide a process of the character described whereby relatively concentrated liquid suspensions of finely divided solids can be treated.

Other objects and advantages of the invention will become apparent during the course of the following description.

Solid materials are used in a number of industries in finely divided form, for example as pigments, fillers or the like. The materials may be produced in a number of ways, e. g. a first group of such materials is produced by precipitation from solution. In such cases the precipitate produced is normally of substantially uniform particle size, relatively coarse or fine according to the conditions under which the precipitation occurs and according to the form which the material can naturally or artificially assume.

A second group of such materials is produced by the reaction in fluid medium of a suitable reagent upon a base which is difficultly or only partially soluble at the concentration at which the reaction takes place. Such a base may be lime or lime containing magnesia, magnesia, baryta, strontia or the like. In such case there is always present a greater or lesser proportion of the base as a solid phase during at least part of the reaction, and of course there is normally coincidentally present a certain amount of base in dissolved condition. It has been found that material so produced is not of homogeneous particle size or size distribution.

Despite the fact that the particles of any given material of this second group are non-homogeneous as to particle size, the majority of the particles, and usually the great majority of the particles, are of approximately one size, and this particle size is responsible for imparting the general distinguishing characteristics to any individual material. I term these characteristic particles "ultimate" particles, and although there may be present a relatively minor amount of particles smaller than ultimate particles which may be termed "subultimate" particles, the subultimate particles play but a minor role in determining the general characteristics of the material. As an example of the effect of ultimate particle size in determining the general nature of a material, calcium carbonate in the form of lime mud may be cited as being characterized by a relatively coarse ultimate particle size, whereas calcium carbonate magnesium hydroxide may be cited as being characterized by a relatively fine particle size.

In this second group of materials I have found that there are two other main groups of particles, the first of which I term "oversize" and the second of which I term "intermediate". All particles larger than the ultimate fall into one or the other of these two groups.

Practically all of the materials of the second group have been put through a fine mesh screen in the process of their manufacture, usually 150 mesh or even finer, for example, 200 mesh in certain cases. The presence of any particles larger than will pass through the mesh originally used is therefore fortuitous. The particles in the combined oversize and intermediate groups thus consist of sizes ranging from those just passing through 150 or 200 mesh, as the case may be, down to the size of the ultimate particles.

When the materials of the second group are used as pigments or fillers, for example in the paper industry, I have found that all particles therein larger than approximately .001" are very deleterious. All particles larger than approximately .001" I have termed "oversize" particles, whereas all particles between the oversize and ultimate I have termed "intermediate".

There is a third group of materials which occur naturally in massive form and/or which require comminution prior to use, for example barytes, chalk, clay and the like. Such materials when comminuted or otherwise treated commercially produce non-homogeneous fillers, but differ from the second group of materials in that there is no definite ultimate particle size which imparts its definite characteristics to the material, but rather the material consists of all particle sizes from the coarsest down to the very finest. Such materials also are usually subjected to some type of separation before use to take out the coarse particles, but they almost always still contain particles larger than .001", i. e. oversize particles.

As stated above oversize particles cause technical difficulties in the use of materials, but it has been found very difficult commercially to remove them. If they could be satisfactorily removed the value of materials would be enhanced.

Likewise materials which have a relatively coarse ultimate particle size, or in which for instance as in the third group mentioned there exists a considerable amount of relatively coarse particles, in many cases would have their commercial value considerably enhanced if their particle size and/or coarser particles could be satisfactorily reduced.

A common method for reducing oversize and/or coarse particle size is by grinding. In the grinding field the most suitable equipment is a mill such as a pebble, ball or rod mill. These mills will reduce the particle size and/or the oversize of materials, but they have several disadvantages inherent in their use. The first disadvantage is the excessive time required to produce this result, and the fact that where absolutely uniform results are desired, a batch process must be resorted to. Such processes suffer the disadvantages generally inherent in batch processes over those of the continuous type. Another difficulty is that these mills in order to operate successfully, particularly on wet materials, have to operate on relatively concentrated suspensions or slurries of these materials and are thus not convenient for introduction into a process where material does not ordinarily occur at the concentration desired.

Another and more serious disadvantage, especially if a mill of this type is desired to be used for the reduction of oversize particles, is that the mill does not selectively act on the oversize particles but actually comminutes the particles of all sizes with the result that if the object be merely to reduce the oversize this cannot be achieved, as while the oversize is being reduced all the other sizes are being simultaneously reduced, in the case of the finer particles almost to colloidal condition. This in certain cases so changes the characteristics of the material that the beneficial results obtained by reducing the oversize are negatived by the change in the particle size of the rest of the material.

Furthermore in so milling light colored materials, the color is very seriously impaired by the milling operation. This greatly reduces the economic value of pigments or fillers for any use in which high whiteness or purity of color is important. Another disadvantage of mills of this type is that milling does not tend to make an originally non-homogeneous material more homogeneous as it merely results in shifting the particle size distribution curve toward the finer sizes, as each particle size originally existing in the materal is progressvely reduced to a finer size.

Other methods of oversize elimination exist and are practiced, but these all have serious disadvantages. For example, elutriation or hydroseparation has been used to remove oversize particles, but material produced by the most efficient apparatus at present available has proven on examination to still contain an appreciable quantity of oversize. Moreover, the apparatus required for the employment of such methods is very large and expensive, requires excessive floor space, and usually involves great dilution together with reconcentration of solids from the necessarily dilute suspensions in which hydroseparation is required to be effected. Air separation methods have also been tried for removing the oversize but examination of the products produced by these methods also show the presence of an appreciable quantity of oversize remaining in the materials. Furthermore, such methods have the very great disadvantage of being useful only on dry materials, and materials produced in the wet condition thus require drying before such air separation can be employed. This is costly and in certain cases results in the agglomeration of the particles on drying, the agglomerates formed not readily dispersing on subsequent wetting. Also such methods do not function properly when oversize particles of a different specific gravity from the main group of particles exist in the materials to be treated.

It is thus seen as indicated above that present methods for reducing or removing oversize and/or relatively coarse particles have important disadvantages and that a satisfactory method of reducing oversize and/or the relatively coarse particle size of materials and/or rendering the particle size of materials more uniform is greatly to be desired from a commercial standpoint.

I have devised a method whereby relatively coarse particles in liquid suspension may be reduced in particle size, which method has none of the disadvantages inherent in the methods above noted. This method is effective when used with the first group of materials described for reducing the particle size of materials having relatively coarse particle size. It does not, however, substantially affect the particle size of materials already having very fine particle size.

It is useful in treating the second group of materials by reducing the size of the oversize, the reduced oversize thus giving an increased amount of intermediate particles, and to a lesser degree a very slightly increased amount of ultimate particles produced from the breaking down of the oversize. Likewise there is a tendency for the larger intermediate particles to be reduced to smaller intermediate particles. Only when the ultimate particle size is comparatively coarse is there any perceptible reduction of the ultimate and then this reduction does not take place indefinitely as when grinding in a pebble mill, but only to a limited degree. Thus the production of excessively fine or colloidal particles which occurs during a grinding mill operation is avoided. On the whole these materials are rendered more homogeneous by a restriction of particle size distribution. In the treatment of materials in the third group, my method serves to reduce oversize particles and to reduce the larger of the other particle sizes present. It may be seen that in general, therefore, my method serves to reduce oversize and/or relatively coarse particle size of materials, such as those in the various groups indicated above.

The method I have devised is to subject a liquid suspension of a finely divided solid to the action of a homogenizer. The word "homogenizer" is sometimes used loosely to include what is known as a "colloid mill". A colloid mill is primarily a machine in which disintegration is caused by the passage of a material between an element rotating at high speed and a stationary element in very close but spaced alignment therewith, or in some cases between two elements rotating at high speeds, one of which usually rotates in a direction opposite to the other. In some cases the surfaces may be smooth and in others they may have various corrugations, projections and the like which are said to aid in the mechanical disintegration of the particles. Where the surfaces are smooth, it is claimed that disruption of the particles takes place by the shearing of the liquid film rather than by any actual grinding. The type of homogenizer to which I prefer does not include the colloid mill as described above. It refers rather to what is known as the pressure type of homogenizer, that is, a machine which pumps material at high pressure through a small orifice, the pressure being controlled by the maintenance of an orifice of a substantially definite size. The orifice is normally formed by two homogenizing elements or surfaces which may be brought together with extreme closeness. These elements ordinarily comprise the homogenizing valve and valve seat. This is the type of machine which was originally invented for the blending or homogenizing of the fat globules in milk, and most of the machines are equipped with non-rotating homogenizing valves. The homogenizing valve in the non-rotating type is customarily held by spring pressure or the like to form with the valve seat an orifice of substantially definite size, and the pressure is ordinarily controlled by exerting more or less force against a spring holding the homogenizing valve. The primary distinguishing feature of the pressure homogenizer is that high pressure feed is used to effect the homogenization of the material as it passes through the restricted orifice between the homogenizing elements.

The homogenizer has hitherto been considered entirely incapable of reducing the particle size of solid material. For example, Travis, in his book on "Mechano-Chemistry and the Colloid Mill", published by the Chemical Catalog Co. Inc. N.Y., 1928, makes the following statement on page 118, lines 9-11 inclusive: " . . . the homogenizer is adapted only for making emulsions and will handle only liquids. Solid particles cannot be dispersed through a homogenizer". And again in "Industrial & Engineering Chemistry" 21, 5 (1929) page 421 he says: " . . . it" (the pressure type of homogenizer) "is not suitable, however, for the dispersion of solids . . . ".

I have found, however, contrary to the prior held views, that under suitable conditions a homogenizer may be used to great advantage on suspensions of solids for the purpose of reducing the oversize of the relatively coarse particle sizes thereof, without substantially affecting the size of extremely fine particles passed therethrough.

I have found by experiment that it is possible to subject mixtures of considerable concentration of solids successfully to pasage through a homogenizer and accomplish the desired result. For instance it is possible to pass a suspension containing 250 grams per litre of a filler, for example calcium carbonate magnesium hydroxide through a homogenizer. This is a fairly thick suspension but there was no indication that this was the limiting concentration of suspension which could be used, as such suspension passes through with great ease. The use of suspensions of such concentrations is of particular advantage as such are approximately the concentrations at which certain fillers exist during at least one point in their course of manufacture, and thus the reduction of oversize particles in such fillers becomes a question merely of the passage of suspensions thereof through a homogenizer during their process of manufacture.

I have found that in many instances the total pressure applied to the homogenizer valve or valves appears to be the factor controlling the efficacy of the homogenizer for my purpose. The ordinary commercial homogenizer is constructed to give 4000 or 5000 lbs. total pressure. My experiments indicate in many cases that it is not the number of times a material passes between the homogenizing valve and valve seat but rather the total pressure to which the material is subjected, which is the important factor. In fact it appears that high pressures and few passages are important rather than low pressures and many pasages, even where the total resulting pressure used is the same.

For example, a sample of calcium carbonate magnesium hydroxide in a suspension of 250 g. p. l. which had already passed through 150 mesh wire cloth with openings approximately .003", and which contained approximately 2% of oversize particles on the weight of the bone dry material present, had these oversize particles reduced more completely by passing between two homogenizing valves and valve seats reading respectively 4000 and 3000 lbs. (i. e. an initial differential pressure of 1,000 lbs. and second differential pressure of 3,000 lbs., or a total of 4000 lbs.) than when it was passed between 8 homogenizing valves and valve seats, each valve set at 500 lbs. pressure differential or a total of 4,000 lbs.

I found, however, that in the case noted above one passage through a two valve homogenizer with a pressure of 4,000 lbs. was insufficient to reduce all the oversize. I found that it took three passages through the machine in order to accomplish this in this particular instance. In other words, in this particular case 12,000 lbs. total pressure was required.

It will be readily understood, of course, that the above is merely illustrative of one result obtained with one material, and that as the percent of oversize and/or relatively coarse partic.e size of materials vary as well as other factors such as the hardness of the material and/or oversize, the liquid medium employed, temperature, dissolved materials and the like, that other pressures, concentrations, and number of passages between the homogenizing valve or valves and valve seats may give better results and that such conditions will have to be determined for each individual material.

There are several points concerning the homogenizer which should be considered in its use for my purpose. The principal thing is that the valves and valve seats of the pump should be made removable and/or of very hard material similar to that used in the homogenizing valves and valve seats discussed below. Ordinarily bronze valves and bronze valve seats score very quickly so that in a very short time the pump of the homogenizer is rendered useless. On the other hand the homogenizing valves and valve seats ordinarily furnished with a commercial machine are very much more suitable. These valve seats are sometimes made of some hard steel composition or may be made from some very hard non-ferrous metal such as "Stellite". However, for long runs and continuous operation, in certain cases it may be desirable to use chromium plated homogenizing valves and valve seats which can be plated relatively cheaply, replating when necessary, or the homogenizing valves and seats may be made of one of the several extremely hard tungsten carbide composition materials now on the market such as the material known as "carboloy" which is a tungsten carbide-cobalt composition.

In homogenizing any given solid material it should be determined experimentally just how much total pressure is desired to bring about the desired quality of material. If this is not over 8,000 or 10,000 lbs., a special homogenizer can be constructed which can give this amount of pressure in one passage therethrough and such a homogenizer is preferable from the standpoint of simplicity of operation. However if the pressures mount much above this it is desirable to use two or more machines in series or to pass the material more than once through the same machine.

Another precaution which is important to observe in the passage of solid materials through a homogenizer is that of sieving the material prior to homogenizing, preferably through at least a 150 mesh sieve. Particularly must all materials of fibrous nature such as very easily get into manufactured products through the medium of bagging, barrels and the like be substantially completely removed. These little fibres, whether wood or textile, collect and get under the valve seats of the pump and cause great fluctuations in the pressure as shown by the pressure gauges. A proper sieving of the material before use substantially eliminates this difficulty. Furthermore, certain solids which settle easily have a tendency to settle out in the inlet manifold or chamber from which the suction valves of the pump feed. In a homogenizer designed specifically for the purpose of processing solid materials, this may be avoided by bringing the inlet manifold above the suction valves instead of below as in homogenizers as ordinarily constructed.

In the practice of my invention it is preferable to start the homogenizer on a relatively thin liquid, preferably one containing substantially no solids or at least having solids present only in lesser degree. For instance if an aqueous suspension is to be used, the homogenizer may be started on water, the valve or valves being set somewhat below the pressure which they are expected to operate, and then the water followed up with the suspension to be homogenized. If oil is to be the vehicle in which the solids are suspended, oil should be used instead of water to start the machine, and similarly with any other suspending medium. In operating in this way, trouble is avoided which often occurs when it is attempted to pump the suspension direction through the homogenizer and set the homogenizing valves on the suspension itself. In such cases it occasionally happens that the pump valves plug up and the gauges show violent fluctuations of pressure with consequent endangering of the apparatus. By using the procedure of following a liquid, on which the homogenizing valves have been partially set, by the suspension of solids, I have found that this difficulty may be substantially completely avoided. The pressure will come up somewhat on the suspension of solids over that which it was on the liquid, but just at or during the time when the solid suspension is flowing through, the homogenizing valve or valves can be properly adjusted without difficulty.

It is sometimes not desired to pass the mere solids themselves through a homogenizer either in water or other liquid suspension, but rather to pass an industrial combination of materials through the homogenizer. Such a case is when liquids containing pigments which contain some oversize are desired to be improved, such as for example printing inks. Another case is in the coating of paper where coating mixtures are made with a solution of adhesive such as casein, starch, glue, or the like, in connection with pigments such as clay, calcium carbonate magnesium hydroxide, satin white, blanc fixe and the like. After these pigments are blended with the adhesive in watery suspension and such other materials as waxes, anti-froth oils and the like are added in minor amount if desired, then these mixtures may be subjected to homogenization to improve their quality by the reduction of the oversize particles and/or the relatively coarse particle size of the solids contained therein. Similarly advantageous results are obtained with lacquers and paints by my process.

Also homogenization of solid particles is sometimes useful in rendering chemical reactions more complete, for example in the case where sodium carbonate reacts with lime to form sodium hydroxide, homogenization of the resulting mix breaks down the larger particles of the lime which may not previously have been acted upon, and/or the calcium carbonate particles formed on a nucleus of a lime particle, and brings the sodium carbonate solution into very intimate contact with this finely comminuted and exposed lime, and thus assists in rendering the reaction more complete.

The homogenization of solids by my method is accomplished by passing material in liquid suspension through a restricted orifice under high pressure. Substantially the only particles that are broken down by going through this restricted orifice are particles which are too large to pass through. Substantially all the particles which are small enough to pass through are unacted upon. There are thus produced in certain cases novel materials particularly suited for certain industrial uses.

It will be apparent that my method herein disclosed has many advantages over prior art methods, that in certain instances products of novel physical composition are obtained, and that it opens the way for the obtaining of important economies in many manufacturing operations and in the products thereof.

Whereas I have described my invention in detail and given illustrative examples thereof, it will be understood that such examples are illustrative only and not restrictive and that my invention may be carried out with numerous changes in procedure, steps and with materials other than those mentioned without departing from the spirit of my invention or the scope of the subjoined claims.

I claim:

1. The method of operating a homogenizer on solids comprising passing a liquid suspension containing a lesser concentration of solids therein through a homogenizer, and following said suspension with a liquid suspension containing a greater concentration of solids.

2. The method of operating a homogenizer on solids comprising passing a substantially solid-free liquid through a homogenizer, and following said liquid with a liquid suspension of solids.

3. The method of operating a homogenizer on solids comprising passing a liquid suspension containing a lesser concentration of solids therein through a homogenizer, setting homogenizing elements so that the homogenizer will operate under pressure, and following said suspension with a liquid suspension containing a greater concentration of solids.

4. The method of operating a homogenizer on solids comprising passing a substantially solid-free liquid through a homogenizer, setting homogenizing elements so that the homogenizer will operate under pressure, and following said liquid with a liquid suspension of solids.

5. The method of treating finely divided solid material comprising a plurality of groups of particles of varying sizes including a group in which the particles do not exceed a predetermined maximum size and a group comprising oversize particles, which comprises preparing a liquid suspension of said finely divided solid material, and substantially reducing said oversize particles without substantial reduction of the size of the particles in said first named group by forcing said liquid suspension under high pressure through a restricted orifice comprising relatively non-rotated elements.

6. The method of treating finely divided solid material comprising a plurality of groups of particles of varying sizes including a group of ultimate particles and a group of oversize particles, which comprises preparing a liquid suspension of said finely divided solid material, and substantially reducing said oversize particles without substantial reduction of said ultimate particles by forcing said liquid suspension between relatively non-rotated homogenizing elements under high pressure.

7. The method of treating finely divided solid material composed of particles of varying sizes including ultimate particles and oversize particles which comprises preparing a liquid suspension of said finely divided solid material, and substantially reducing said oversize particles without substantial reduction of said ultimate particles by subjecting said liquid suspension to homogenization between relatively non-rotated homogenizing elements at a total pressure of not less than 4,000 pounds.

HAROLD ROBERT RAFTON.